United States Patent [19]
Cho

[11] Patent Number: 5,116,284
[45] Date of Patent: May 26, 1992

[54] TENSIONER FOR A POWER TRANSMISSION BELT OR THE LIKE

[76] Inventor: Nakwon Cho, 3604 Kranbrook La., Knoxville, Tenn. 37921

[21] Appl. No.: 683,999

[22] Filed: Apr. 11, 1991

[51] Int. Cl.$^5$ .................................................. F16H 7/08
[52] U.S. Cl. ................................ 474/110; 474/135; 474/138
[58] Field of Search ..................... 474/101, 109–111, 474/113–117, 135, 138

[56] References Cited

U.S. PATENT DOCUMENTS

| | | | |
|---|---|---|---|
| 4,411,638 | 10/1983 | Wilson | 474/138 |
| 4,472,161 | 9/1984 | Ojima | 474/111 |
| 4,539,001 | 9/1985 | Okabe | 474/138 |
| 4,708,696 | 11/1987 | Kimura et al. | 474/103 |
| 4,798,563 | 1/1989 | Okabe et al. | 474/110 |
| 4,911,679 | 3/1990 | Inoue et al. | 474/110 |

Primary Examiner—Thuy M. Bui
Attorney, Agent, or Firm—Luedeka, Hodges, Neely & Graham

[57] ABSTRACT

A tensioner for a power transmission belt or the like includes a housing providing an elongated interior cavity opening out of one end of the housing and a piston positioned within the cavity for movement therealong for dividing at least a part of the interior cavity into first and second variable-volume chambers for holding hydraulic fluid wherein the second variable-volume chamber is closer to the one housing end than is the first variable-volume chamber. The tensioner utilizes a distensible bellows section connected between the piston and the housing for separating the second variable-volume chamber from the cavity opening at one end of the housing. A plunger is connected to the piston and extends out of the one end of the housing, and a spring is interposed between the piston and the housing for biasing the piston toward the one end of the interior cavity so that the plunger is urged out of the one housing end. Flow control passages associated with the first and second variable-volume chambers permit a substantially unrestricted flow of hydraulic fluid from the second variable-volume chamber to the first variable-volume chamber and permit a controlled flow of hydraulic fluid from the first variable-volume chamber to the second variable-volume chamber. Consequently, when the housing is fixed in a stationary condition adjacent a belt to be tensioned and the plunger is positioned for interacting with the belt, oscillatory forces which would tend to flutter or vibrate the belt are dampened and any oscillatory motions experienced by the belt are limited.

13 Claims, 4 Drawing Sheets

TENSIONER FOR A POWER TRANSMISSION BELT OR THE LIKE

BACKGROUND OF THE INVENTION

This invention relates generally to tensioning devices and relates, more particularly, to means for tensioning a power transmission belt or the like connected between a drive wheel and a driven wheel.

A belt tensioning device with which this invention is to be compared includes a housing having an elongated internal cavity, a piston head slidably positioned within the housing cavity for separating the cavity into two variable-volume chambers for holding hydraulic fluid, a plunger joined to the piston head and extending through an opening provided in one end of the housing for movement with the head as the head is moved along the housing cavity. A spring is interposed between the piston head and housing for biasing the head toward one end of the cavity, and flow control means are associated with the two variable-volume chambers for permitting a substantially unrestricted flow of hydraulic fluid from one variable-volume chamber to the other variable-volume chamber as the piston head is moved by the spring toward the one housing end and which permits a controlled flow of hydraulic fluid from the other variable-volume chamber to the one variable-volume chamber as the piston head is moved against the force of the spring away from the one housing end. Examples of such belt tensioning devices are shown and described in U.S. Pat. Nos. 4,472,161, 4,539,001 and 4,708,696.

For use of such a tensioning device, one of its housing and plunger is mounted in a fixed relation adjacent a belt desired to be tensioned, and the other of the housing and plunger is positioned in cooperating relationship with the belt so that the spring acts between the housing and plunger to urge the belt in one direction and thereby establish spring-induced tension in the belt. If, on one hand, the belt is displaced in the one direction, such as by oscillatory forces generated during sudden acceleration of the drive wheel, the spring moves the housing and plunger relative to one another by a corresponding amount to compensate for the displacement of the belt in the one direction and thereby re-establish spring-induced tension in the belt. As the housing and plunger are moved by the spring to compensate for belt displacement, hydraulic fluid flows freely from the one variable-volume chamber to the other variable-volume chamber so that the movement of the housing and plunger relative to one another is substantially unrestricted. If, on the other hand, the belt is displaced in the direction opposite the one direction so that the housing and plunger are forced to move relative to one another against the force of the spring, the controlled flow of hydraulic fluid to the one variable-volume chamber from the other variable-volume chamber limits the rate of relative movement of the housing and plunger. As a consequence of the substantially unrestricted relative movement of the housing and plunger in the one direction and the controlled rate of relative movement of the housing and plunger in the opposite direction, forces which would tend to oscillate the belt are resisted and oscillatory motions of the belt are dampened by the tensioning device.

It is an object of the present invention to provide a new and improved tensioner of the aforedescribed class.

A further object of the present invention is to provide such a tensioner which is relatively easy to assemble and uncomplicated in construction.

Another object of the present invention is to provide such a tensioner which is economical to manufacture and effective in operation.

Still another object of the present invention is to provide such a tensioner having a reduced susceptibility of leaking hydraulic fluid.

SUMMARY OF THE INVENTION

This invention is embodied in a tensioner for a power transmission belt or the like.

The tensioner includes housing means providing an elongated interior cavity having two opposite ends and including an opening which opens between the exterior of the housing means and the interior cavity at one end thereof. The tensioner also includes piston means having a head which is positioned within the interior cavity for movement therealong between the opposite ends thereof and for dividing at least a part of the interior cavity into first and second variable-volume chambers for holding hydraulic fluid wherein the first variable-volume chamber is disposed on one side of the piston head opposite the one cavity end and the second variable-volume chamber is disposed on the other side of the head. The piston means also includes a plunger which is connected to the head for movement therewith along the cavity and having an end portion which extends through the opening in the housing means for interaction of the housing means and plunger between a power transmission belt and a stationary structure adjacent the belt. A spring is interposed between the piston means and the housing means for biasing the piston means toward the one end of the interior cavity from the other end thereof, and bellows means are connected between the piston means and the housing means for separating the second variable-volume chamber from the opening in the housing means and for accommodating limited changes in the fluid volume of the variable-volume chambers. Flow control means are associated with the first and second variable-volume chambers for permitting substantially unrestricted flow of hydraulic fluid from the second variable-volume chamber to the first variable-volume chamber as the piston head is moved by the spring toward the one cavity end and for permitting a controlled flow of hydraulic fluid from the first variable-volume chamber to the second variable-volume chamber as the piston head is moved against the force of the spring away from the one cavity end.

DETAILED DESCRIPTION OF THE ILLUSTRATED EMBODIMENTS

Figure 1:
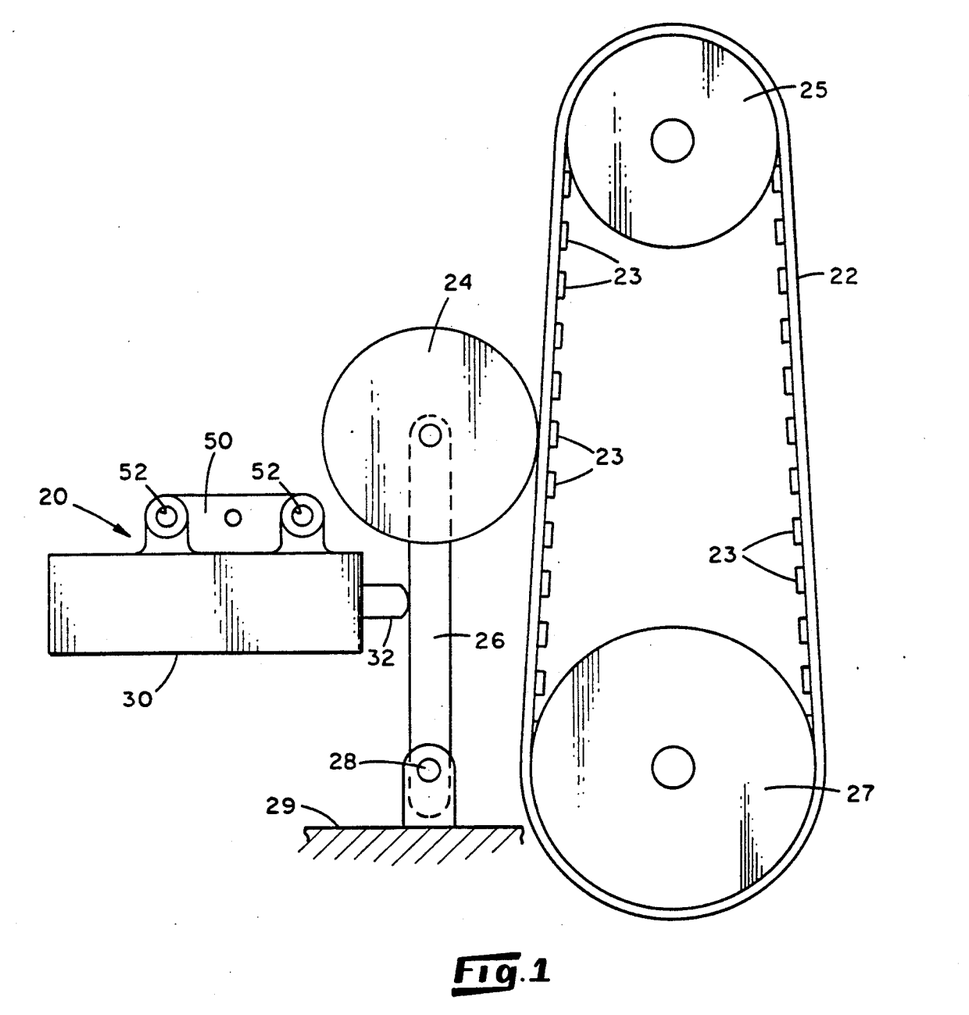
FIG. 1 is an elevational view illustrating schematically an embodiment of a tensioner within which features of the present invention are incorporated and a belt tensioned by the tensioner.

Turning now to the drawings in greater detail, there is illustrated in FIG. 1 an embodiment, indicated 20, of a tensioner shown utilized for tensioning a power transmission, e.g. a timing, belt 22 connected between toothed drive and driven wheels 25, 27. The belt 22 is constructed of synthetic rubber or the like and includes a plurality of teeth 23 provided along one face thereof for engaging the teeth of the drive and driven wheels 25, 27. The face of the belt 22 opposite the teeth 23 is engaged by a roller 24 which is appropriately journaled upon the end of an arm 26. The end of the arm 26 opposite the roller 24 is pivotally joined to a supporting structure 29, such as the block of an internal combustion engine, with a pivot pin 28. The tensioner 20 is affixed to the supporting structure 29 and acts against the arm 26 for urging the fragment of the belt 22 engaged by the roller 24 rightwardly as illustrated in FIG. 1. If during operation of the belt 22, the belt 22 is exposed to forces which would tend to oscillate the engaged belt fragment rightwardly and leftwardly in a fluttering motion, such as may be generated during a sudden acceleration of the drive wheel 25, the tensioner 20 acts through the arm 26 and roller 24 to resist and dampen oscillatory motion of the belt 22. By resisting and dampening oscillatory motions of the belt 22, the tensioner 20 reduces any likelihood that the belt will jump a tooth or otherwise effect the timing of an engine with which the belt may be used.

Figure 2:
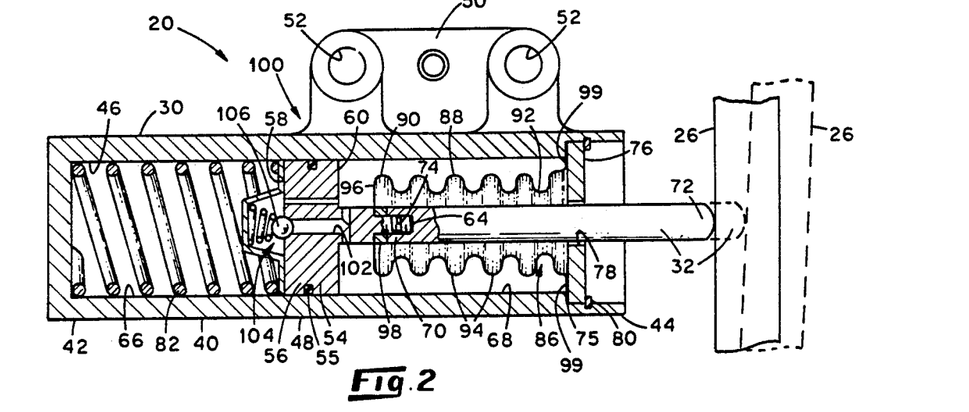
FIG. 2 is a longitudinal cross-sectional view of the tensioner of FIG. 1.

With reference to FIG. 2, the tensioner 20 includes housing means 30 for securement to the supporting structure 29 (FIG. 1) to which the pivot pin 28 is joined. The housing means 30 of the tensioner 20 includes an elongated body 40 having two opposite ends 42, 44 and a cylindrical interior cavity 46 opening out of the body end 44. The body 40 includes a major portion 48 having an outer shape which is substantially cylindrical in form and a lug portion 50 extending to one side of the cylindrical portion 48. To facilitate the mounting of the housing means 30 to the supporting structure 29, there is provided a pair of mounting holes 52 for receiving the shanks of mounting bolts (not shown). The housing body 40 may be constructed of any of a number of suitable materials, such as aluminum.

Figure 3:
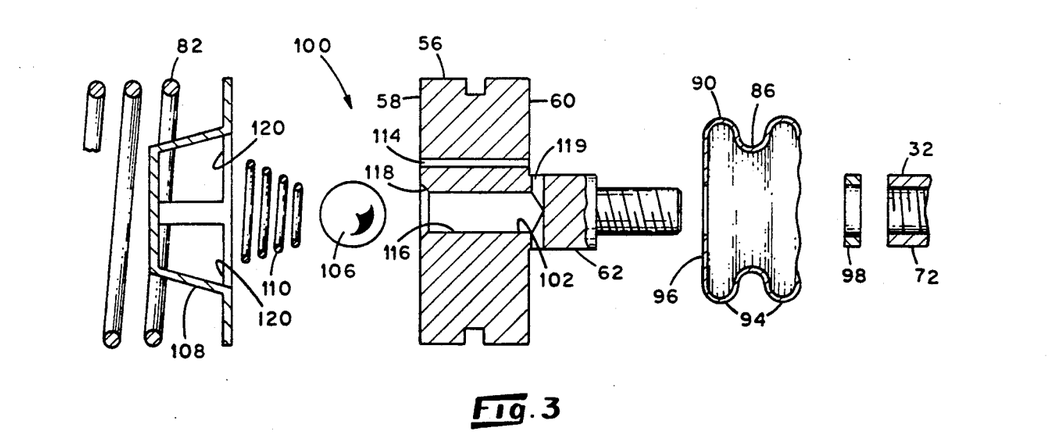
FIG. 3 is a cross-sectional view of an assemblage of components of the FIG. 1 tensioner as illustrated in FIG. 2 shown exploded and drawn to a larger scale.

The tensioner 20 also includes piston means 54 slidably received within the cavity 46 for sliding movement relative to and along the length of the housing body 40 between the body ends 42, 44. As shown in FIGS. 2 and 3, the piston means 54 includes a cylindrically-shaped plug-like head 56 constructed for example, of steel, and having a diameter which is slightly smaller than the diameter of the interior cavity 46. One side, indicated 58, of the piston head 56 is substantially planar and the other side, indicated 60, of the head 56 includes a neck section 62 of reduced diameter extending therefrom. One end of the neck section 62 terminates in a threaded portion 64 as shown in FIG. 3. It follows that the piston head 56 divides the interior cavity 46 (FIG. 2) into first and second variable-volume chambers 66, 68, respectively, disposed on opposite sides of the head 56. The spacing between the piston head 56 and cavity wall is sealed with an O-ring 55 fitted within an annular groove encircling the head 56. As is apparent herein, the chambers 66, 68 are adapted to hold a suitable hydraulic fluid, such as a silicone fluid.

Associated with the piston head 56 is a plunger 32 having two opposite ends 70, 72 and which extends out of the housing body 40 for engaging the arm 26. One end 70 of the plunger 32 is suitably joined to the piston head 56, and the other plunger end 72 protrudes from the housing body 40 through the open end 44 thereof. In the depicted embodiment 20, the plunger end 70 is connected to the side 60 of the piston body 56 by way of the neck section 62. More specifically, an internally-threaded bore 74 is provided in the plunger end 72 for threadably receiving the threaded portion 64 of the neck section 62 to thereby secure the plunger 32 to the piston head 56. As the piston head 56 is moved longitudinally with respect to the housing 30, the plunger 32 moves with the head 56 along the length of the housing cavity 46.

With reference still to FIG. 2, the open end 44 of the housing body 40 is closed by a circular plate 76 having a central opening 78 therein. The plate 76 is positioned adjacent an annular shoulder 75 provided in the housing body 40 and secured thereagainst with a retaining ring 80, and the plunger 32 extends through the central opening 78. The plate 76 thereby closes the housing end 44 and ensures that longitudinal movement of the plunger 32 relative to the housing body 40 is directed generally along the longitudinal axis of the plunger 32.

The tensioner 20 further includes a spring 82 which is interposed between the housing body end 42 and the piston head 56 for continually urging the piston head 56 rightwardly, as shown in FIG. 2, with respect to the housing body 40 so that the plunger end 72 is continually urged rightwardly against the arm 26. In the tensioner 20, the spring 82 is a compression spring which provides a continual bias upon the belt 22 (FIG. 1) through the arm 26 and roller 24 for maintaining the belt 22 in a tensioned state.

With reference again to FIG. 2, the tensioner 20 also includes distensible bellows means 86 connected between the piston means 54 and the housing means 30 for separating the second variable-volume chamber 68 from the plate opening 78 through which the plunger 32 extends. In the depicted embodiment 20, the bellows means 86 is in the form of a thin-walled tube 88 having two opposite ends 90, 92 and a series of annular bellows folds 94 between its ends 90, 92. One end 90 of the bellows 86 is sealingly connected to the piston head 56, and the other bellows end 92 is sealingly connected to the housing end 44 adjacent the plate 76. In this connection, the bellows end 90 has a radially inwardly-directed portion 96 which is positioned about the threaded section 64 of the piston head 56 and tightly sandwiched between the neck portion 62 and a washer 98 which is interposed between the plunger end 70 and the bellows end portion 96. The bellows end 92 has a radially outwardly-directed lip portion 99 which is tightly sandwiched between the annular shoulder 75 of the housing body 40 and the circular plate 78 as shown in FIG. 1.

The bellows means 86 may be constructed of any of a number of fluid-impermeable materials, such as a suitable elastomer or steel. The bellows folds 94 provided between the bellows ends 90, 92 accommodates a longitudinal distention and contraction of the bellows means 86 as the piston head 56 and plunger 32 are moved along the length of the housing cavity 46. The flexibility of the bellows means 86 also accommodates a degree of change in volume of the chamber 68, even if the piston head 56 and plunger 32 remain stationary with respect to the housing body 40. As is apparent herein, such a flexibility of the bellows means 86 is advantageous in that the volume of the chamber 68 can increase or decrease to accommodate a volumetric change in the fluid of the chamber 68 due, for example, to the thermal expansion or contraction of the fluid.

With reference again to FIGS. 2 and 3, the tensioner 20 also includes flow control means 100 associated with the first and second chambers 66, 68 for permitting a substantially unrestricted flow of fluid from the second chamber 68 to the first chamber 66 while permitting a controlled flow of fluid from the first chamber 66 to the second chamber 68. To this end, the flow control means 100 includes a passageway 102 formed in the piston head 56 and check valve means 104 associated with the passageway 102 for limiting the flow of fluid through the passageway 102 to one direction. As best shown in FIG. 3, the passageway 102 includes an axial bore section 116 opening out of the piston head side 58 at an entrance 118 and a transverse bore section 119 extending through the neck portion 62 and communicating with the bore section 116. The check valve means 104 includes a spherical ball 106, a hat-shaped ball cage 108 and a conical spring 110 for maintaining the ball 106 in operative relation with the passageway 102. The cage 108 is constructed of metal or plastic and includes through-openings 120 which permit the passage of fluid therethrough. As best shown in FIG. 2, the cage 108 is positioned adjacent the piston head side 58 so that its edges are adjacent the cylindrical wall of the internal cavity 46 and the central section of the cage 108 is positioned about the ball 106. The compression spring 82, introduced earlier, is interposed between the end 42 of the housing body 40 and the edges of the cage 108 to maintain the cage 108 in engagement with the side 58 of the piston head 56. The conical spring 110 is positioned between the central section of the cage 108 and the spherical ball 106 as illustrated in FIG. 2 so that the ball 106 is biased into seating relationship with the passageway entrance 118 of the piston head side 58. To enhance the seating of the ball 106 within the passageway 102, the surface of its entrance 118 is shaped complementary to that of the surface of the ball 106.

It follows that when the piston body 56 is moved rightwardly as viewed in FIG. 2 in a manner which increases the pressure of the fluid contained within the second chamber 68 by a sufficient amount, the fluid of the second chamber 68 unseats the ball 106 from the passageway entrance 118 so that fluid is permitted to flow substantially unrestricted through the passageway 102 from the chamber 68 into the chamber 66. When, on the other hand, the piston body 56 is urged leftwardly as viewed in FIG. 2 so that the pressure of the fluid contained within the first chamber 66 is increased, the pressure differential of fluid contained within the chambers 66 and 68 permits the spring 110 to seat the ball 106 in the passageway entrance 118 to thereby prevent fluid from flowing from the chamber 66 to the chamber 68 by way of the passageway 102.

In order to permit fluid to flow from the second chamber 66 to the first chamber 68 at a controlled rate, the flow control means 100 includes a small bore or orifice 114 formed in the piston head 56 so as to extend between the piston head sides 58 and 60. The orifice 114 possesses a predetermined diameter so that fluid contained within the chambers 66, 68 is permitted to pass in either direction through the orifice 114 at a controlled rate. Therefore, even if the pressure of the fluid contained within the first chamber 66 is elevated above that of the fluid contained within the second chamber 68 so that fluid is prevented from flowing through the passageway 102, the orifice 114 permits fluid flow from the first chamber 66 to the second chamber 68.

During belt operation and with reference again to FIGS. 1 and 2, the belt 22 may tend to flutter or oscillate between two positions in a manner which urges the arm 26 and plunger 32 between a rightward position as illustrated in phantom in FIG. 2 and a leftward position as illustrated in solid lines in FIG. 2. As mentioned earlier, such a tendency of the belt 22 to shift in the aforedescribed manner may be experienced during a sudden acceleration of the drive wheel 25. With the tensioner 20 fixed adjacent the belt 22 in the manner illustrated in FIG. 1 so that the plunger end 72 engages the arm 26, the roller 24 is continually urged rightwardly under the influence of the compression spring 82 to tension the belt 22 along its length. If, on one hand, the fragment of the belt 22 engaged by the roller 24 is shifted rightwardly as viewed in FIG. 1, the spring 82 moves the plunger 32, arm 26 and roller 24 rightwardly by a corresponding amount to re-establish spring-induced tension along the belt length. Of course, as the piston head 56 and plunger 52 are shifted rightwardly, fluid is permitted to flow substantially unrestricted from the second chamber 68 to the first chamber 66 through the passageway 102 provided in the piston head 56. If, on the other hand, the fragment of the belt 22 engaged by the roller 24 is urged leftwardly as viewed in FIG. 1 with sufficient force to overcome the biasing strength of the compression spring 82, the piston head 56 is permitted to shift leftwardly at a slow, controlled rate due to the restricted rate of fluid flow through the piston head orifice 114. It follows that the tensioner 20 resists forces which may otherwise cause the belt 22 to flutter or oscillate during belt operation and dampens any fluttering or oscillatory motion experienced by the belt 22.

As mentioned earlier, the bellows means 86 accommodates a degree of change in the volume of the second chamber 68. Such a feature is advantageous when considering the fact that temperature changes of the fluid within the housing cavity 46 effect either a corresponding increase or decrease in the pressure or volume of the fluid. Heretofore, volumetric changes in the fluid could be accommodated by the provision of an accumulator or similar reservoir connected in flow communication with the housing cavity for receiving excess fluid from or discharging make-up fluid into the cavity. However, with the bellows means 86 accommodating volumetric changes in the fluid of the cavity 46, any need for such an accumulator or similar reservoir is obviated.

In addition, the tensioner 20 provides an advantage in that its orifice 114 for controlling the flow of fluid from the second chamber 68 to the first chamber 66 is easy to form. More specifically, the orifice 114 is drilled through the sides of the piston head 56 prior to assembly of the tensioner 20. In contrast, some belt tensioners of the prior art utilize a controlled amount of spacing between the piston head and the interior wall of the housing cavity for controlling fluid flow between its variable-volume chambers. To provide such a spacing, however, the diameter of the piston head and housing cavity must be specially-made or machined within relatively close tolerances, thus contributing to the difficulty and costs of manufacture. By comparison, the ease with which the orifice 114 in the tensioner 20 is formed circumvents any need to manufacture special components for providing a pre-sized spacing between the piston head and housing cavity.

The tensioner 20 is also advantageous in that it is constructed of a relatively few number of components wherein each component is relatively easy to assemble. Still further, fluid may be easily introduced into the cavity 46 through the housing end 44 prior to the installation of the piston head 56. Such a method of fluid introduction is preferred over the provision of a special fluid port in a side of the housing through which fluid may eventually leak. Along these lines, only the bellows ends 90 and 92 need to be sealed to prevent fluid leakage from the cavity 46 of the tensioner 20.

Figure 4:
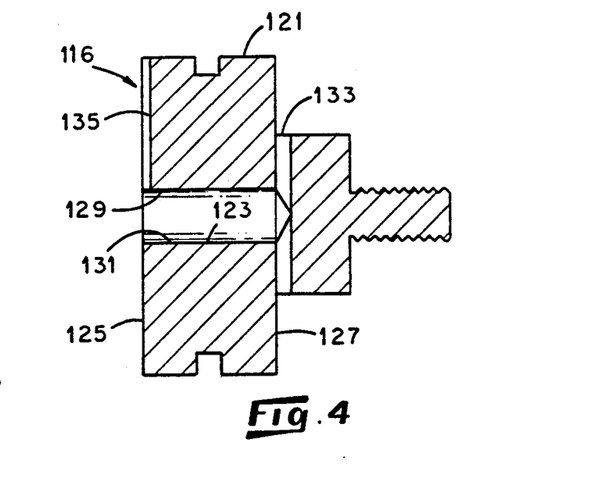
FIG. 4 is a cross-sectional view of an alternative piston head for the assemblage of FIG. 3.
Figure 5:
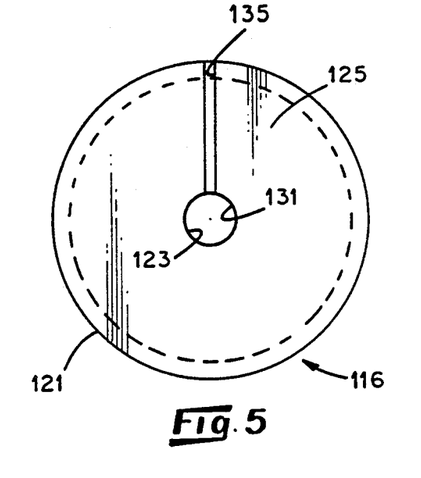
FIG. 5 is an elevational view of the piston head of FIG. 4 as seen from the left in FIG. 4.

Although the flow control means 100 has been shown and described as including an orifice 114 extending between the piston head sides 58 and 60 for controlling the rate of fluid flow from the second chamber 68 to the first chamber 66, this rate of fluid flow may be controlled by alternative means. For example, there is shown in FIGS. 4 and 5 and alternative piston head 116 having a plug-like body 121 within which a passageway 123 is provided for permitting fluid to pass between the opposite sides, indicated 125 and 127, of the body 121. The passageway 123 includes a large central bore section 129 having an entrance 131 and a transverse through-opening 133 communicating with the bore section 129 as shown in FIG. 4. When used with a ball-type check valve (not shown) having a ball for cooperating with the bore section entrance 131, the flow of fluid through the passageway 123 is substantially limited to one-directional flow from the piston head side 127 to the other side 125.

For control of the rate of fluid flow from the piston head side 125 to the other side 127, there is provided a radially-extending groove 135 across the piston head side 125. The groove 135 is substantially U-shaped in cross section and communicates with the bore section entrance 131 so that when a check valve ball is seated within the bore section entrance 131, a limited or controlled amount of fluid is permitted to pass by the ball and into the bore section 129 from the piston head side 125. It follows that when the piston head 116 is substituted for the piston head 56 of the tensioner 20 of FIGS. 1-3 so as to divide the housing cavity into first and second variable-volume chambers 66 and 68, respectively, fluid is permitted to flow substantially unrestricted from the second chamber 68 to the first chamber 66 as the fluid passes through the passageway 123 from the piston side 10 127 to the side 125, but fluid is permitted to flow at a slower, controlled rate from the first chamber 68 to the second chamber 66 as the fluid passes through the groove 135 and into the passageway 123 from the piston side 125 to the side 127.

Figure 6:
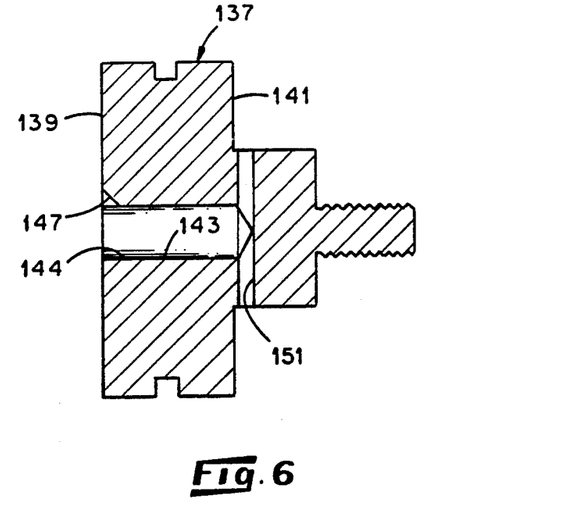
FIG. 6 is a view similar to that of FIG. 4 of another piston head for the assemblage of FIG. 3.
Figure 7:
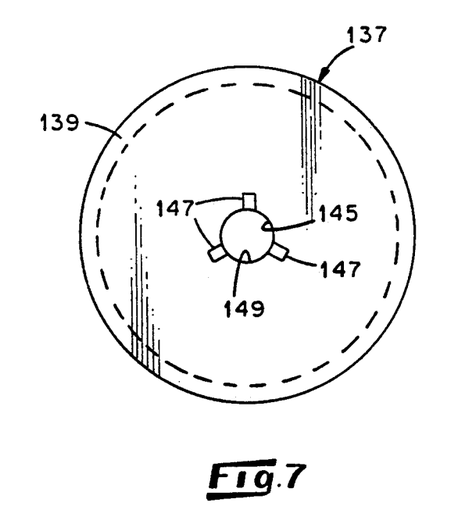
FIG. 7 is an elevational view of the piston head of FIG. 6 as seen from the left in FIG. 6.

In FIGS. 6 and 7, there is shown yet another piston head, indicated 137, having opposite sides 139, 141 and incorporating still another embodiment of flow control means for controlling the rate of fluid flow from one side 139 to the other side 141. In the depicted head 137, there is provided a passageway 143 having a central bore section 145 and a transverse bore section 151 similar in construction to the passageway 123 of the piston head 116 of FIGS. 4 and 5. The bore section 145 has an entrance 149 for cooperating with a ball check valve (not shown), and there are provided three indentations or notches 147 spaced about the entrance of the bore section 145. During operation of a tensioner within which the piston head 137 is incorporated, fluid is permitted to pass at a controlled rate from one piston side 139 to the other piston side 141 as the fluid passes the ball of the ball check valve and into the passageway 143 by way of the notches 147.

Figure 8:
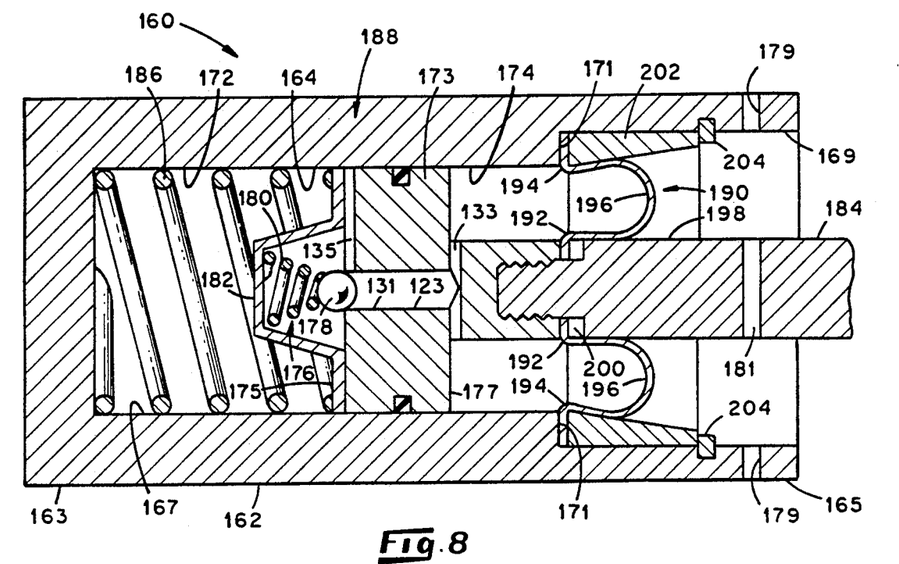
FIG. 8 is a view similar to that of FIG. 2 of an alternative tensioner within which features of the present invention are incorporated.

With reference to FIG. 8, there is shown an alternative embodiment, generally indicated 160, of a tensioner within which features of the present invention are incorporated. The tensioner 160 includes a housing body 162 having two opposite ends 163, 165 and an elongated internal cavity 164 opening out of the body end 165. The cavity 164 includes a leftward section 167 possessing cylindrical walls and a rightward section 169 possessing a slightly larger diameter than that of the leftward section 167, and the rightward and leftward sections 167, 169 meet at a shoulder 171. The tensioner 160 also includes a piston head 173 for separating the cavity 164 into first and second variable volume chambers 172, 174, respectively, for holding a suitable hydraulic fluid. In the tensioner 160, the piston head 173 has two opposite sides 175, 177 and fluid passageways which are similar to those of the piston head 121 of FIGS. 4 and 5. Accordingly, the fluid passageways of the head 173 bear the same reference numerals as those of the head 121. A plunger 184 is threadably connected to the piston head 173 so as to extend out of the housing end 165, and aligned apertures 179, 181 provided in the housing body 162 and plunge 184 may accept a removable pin (not shown) to facilitate installation of the tensioner 160.

The tensioner 160 also includes check valve means 176 including a ball 178 positioned adjacent the piston head side 175 and a spring 180 and ball cage 182 with which the ball 178 is biased into seating relationship with the piston head passageway entrance 131. For biasing the piston head 173 and plunger 184 rightwardly as illustrated in FIG. 8, a compression spring 186 is interposed between the housing end 163 and the ball cag 182. The spring 186 also serves to maintain the ball cage 182 in engagement with the piston head 173 as well as urge the piston head 173 and plunger 184 rightwardly. Flow control means 188 including the piston head passageway 123, the ball 178 and the groove 135 permit a substantially unrestricted flow of fluid from the second chamber 174 to the first chamber 172 and permits a controlled flow of fluid from the first chamber 172 to the second chamber 174.

The tensioner 160 also includes distensible bellows means 190 connected between the piston head 173 and the housing body 162 for separating the second variable-volume chamber 174 from the opening in the housing body end 165 and for accommodating limited changes in volume of the chamber 174. In the tensioner 160, the bellows means 190 is in the form of a thin-walled ring constructed of steel or a suitable elastomeric material having an inwardly-directed lip 192, an outwardly-directed lip 194 and a bellows fold 196 provided between the inward and outward lips 192 and 194. The inward lip 192 is sandwiched between the piston head 173 and the threaded plunger end, indicated 198, and a washer 200 is positioned between the lip 192 and plunger end 198 and the piston head 173. The outward lip 194 is secured to the housing body 162 with a sleeve member 202 having an outer diameter which corresponds to the inner diameter of the housing cavity section 169 and an inner surface which is tapered as shown in FIG. 8. In this connection, the sleeve member 202 is positioned within the cavity section 162 so that the outwardly-directed lip 194 of the bellows means 190 is captured between the housing body shoulder 171 and the sleeve member 202. The sleeve member 164 is, in turn, secured in place with a retaining ring 204.

It follows that the outwardly-directed lip 194 of the bellows means 190 is secured in place to the housing body 162 and the bellows means 156 provides a wall section of the second variable-volume chamber 174. As, therefore, the piston head 173 is moved along the length of the cavity 164, the inward lip 192 moves with the piston head 173 while the outward lip 194 remains fixed along the length of the housing body 162. Accordingly, the bellows means 190 possesses sufficient flexibility to accommodate a shifting of the piston head 173 and plunger 184 along the housing body 162 and to accommodate a limited change in volume of the chamber 174 even if the piston head 173 remains stationary with respect to the housing.

Figure 9:
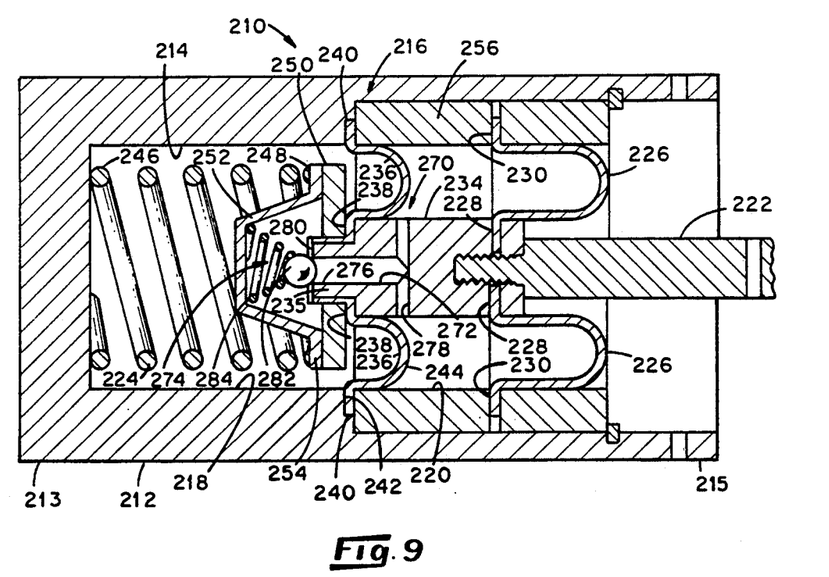
FIG. 9 is a view similar to that of FIG. 2 of another tensioner within which features of the present invention are incorporated.

Although the piston heads of the aforedescribed embodiments have been shown and described as including a body for spanning substantially the entire distance across the housing cavity to divide the cavity into two variable-volume chambers, the piston head may take an alternative form. For example, there is illustrated in FIG. 9 a tensioner 210 including a housing body 212 having two opposite ends 213, 215 and an elongated cavity 214, piston means 216 for separating the cavity 214 into first and second variable-volume chambers 218, 220, respectively, a plunger 222 joined to the piston means 216 and extending out of the housing body 212, and a compression spring 224 for urging the piston means 216 and plunger 222 rightwardly as viewed in FIG. 9. The tensioner 210 also includes bellows means 226 having inwardly and outwardly-extending lips 228, 230, respectively, for separating the second variable-volume chamber 220 from the opening in the housing body end 215. The lips 228, 230 of the bellows means 226 are secured to the piston means 216 and housing body 212 in a manner similar to the manner in which the bellows means 190 of the FIG. 8 tensioner 160 is secured to the corresponding piston head 173 and housing body 162 to accommodate longitudinal movement of the piston means 216 and plunger 222 along the housing cavity 214.

The piston means 216 of the FIG. 9 tensioner 210 includes a plug-like body 234 having a leftward-directed neck 235 positioned substantially centrally of the cavity 214 and a distensible bellows portion 236 spanning the space between the piston body 234 and the interior walls of the cavity 214. In this connection, the bellows portion 236 includes a radially-inwardly directed lip 238 which is positioned and secured about the neck 235 of the piston body 234 and a radially-outwardly extending lip 240 which is secured to the walls of the housing cavity 214 adjacent a shoulder, indicated 242, formed therealong. For securing the outward lip 240 to the housing body 212, there is interposed between the outward lip 240 and the outward lip 230 of the bellows means 226 a sleeve member 256 for securing the lip 240 against the cavity shoulder 242. The bellows portion 236 includes a bellows fold 244 between its inward and outward lips 238, 240 which accommodates longitudinal movement of the piston head body 234 relative to the housing cavity 214. The bellows portion 226 therefore provides substantially frictionless movement between the piston body 234 and the housing body 212 and is advantageous in this respect.

The compression spring 224 of the tensioner 210 is positioned within the cavity 214 and interposed between the housing end 213 and the piston means 216 for urging the piston means 216 rightwardly along the cavity 214. One end, indicated 246, of the spring 224 is positioned in abutting engagement with the cavity end adjacent the housing end 213, and the other end, indicated 248, of the spring 224 is positioned so as to act against the plug-like body 234 of the piston means 216. In this connection, a disc 250 having a central opening is placed about the neck 235 of the body 234 and a ball cage 252 having an outwardly-extending lip 254 is positioned against the disc 250 as illustrated in FIG. 9. The spring end 248 engages the lip 254 of the ball cage 252 so that the cage 252, disc 250, and lip 238 of the bellows portion 236 are tightly sandwiched between the spring end 248 and the piston head body 234. The force of the spring 248 therefore acts against the piston means 216 to continually urge the piston means 216 rightwardly as viewed in FIG. 9 and to enhance the seal between the disc 250 and piston head body 234.

For permitting substantially unrestricted flow of hydraulic fluid from the second variable-volume chamber 220 to the first variable-volume chamber 218 as the piston head body 234 is moved rightwardly by the spring 224 toward the housing end 215 and for permitting a controlled flow of hydraulic fluid from the first chamber 218 to the second chamber 220 as the piston head body 234 is moved leftwardly against the force of the spring 224, the tensioner 210 includes flow control means 270 including a passageway 272 provided in the piston head body 234 and check valve means 274 for restricting fluid flow through the passageway 272. The passageway 272 includes a central bore section opening out of the neck 235 at an entrance 276 and a bore 278 extending transversely through the body 234 as shown in FIG. 9. The passageway 272 also includes a groove section 280 across the face of the neck 235 which opens into the entrance 276 of the passageway bore section.

The check valve means 274 includes a spherical ball 282 positioned adjacent the bore section entrance 276 and a conical spring 284 for biasing the ball 282 into seating relationship with the bore section entrance 276. The ball cage 252, introduced earlier, is positioned about the ball 282 and held in place against the disc 250 by the compression spring 224, and the conical spring 284 is interposed between the cage 252 and ball 282 for biasing the ball 282 toward the bore section entrance 276.

During use of the tensioner 210, each of the first and second chambers 218, 220 are filled with a suitable hydraulic fluid and the housing body 212 is positioned in a stationary relationship adjacent a belt to be tensioned so that the plunger 222 is positioned in interacting relationship with the belt. As the plunger 222 is displaced rightwardly as viewed in FIG. 9, the compression spring 224 moves the piston head body 234 rightwardly by a corresponding amount to re-establish tension along the length of the belt. As the piston head body 234 is moved rightwardly, the increased fluid pressure within the second variable-volume chamber 220 unseats the ball 282 from the bore section entrance 276 so that a substantially unrestricted flow of fluid from the second chamber 220 to the first chamber 218 is permitted through the passageway 272. When the piston head body 234 is moved rightwardly by the belt against the force of the compression spring 224, the ball 282 is seated against the bore section entrance 276 and the fluid contained within the first chamber 218 is permitted to flow to the second chamber 220 by way of the passageway 272 as the fluid is routed past the ball 282 and into the passageway 272 through the groove 280. Due to the small cross-sectional size of the groove 280, fluid is permitted to flow from the first chamber 218 to the second chamber 220 at a controlled rate to limit the rate at which the piston head body 234 can move leftwardly. Consequently, any 10 oscillatory forces which would tend to shift the belt rightwardly and leftwardly are dampened by the tensioner 210 and any oscillatory motion experienced by the belt is limited by the tensioner 210.

It will be understood that numerous modifications and substitutions may be had to the aforedescribed embodiments without departing from the spirit of the invention. For example, although the flow control means of the belt tensioners of FIGS. 1-9 for permitting a controlled flow of hydraulic fluid from the first chamber to the second chamber is provided by a small bore or groove extending through the body of a piston head, such flow control means may take alternative forms. For example, the groove 280 formed in the piston head body 234 of the tensioner 210 of FIG. 9 may be replaced by a small orifice or hole provided within the fold of the bellows portion 236 of the piston means 216. With the fluid permitted to flow from the first chamber 218 to the second chamber 220 only through such an orifice at a controlled rate, the rate at which the piston means 234 may move leftwardly is also controlled. Accordingly, the aforementioned embodiments are intended for the purpose of illustration and not as limitation.

What is claimed is:

1. A tensioner for a power transmission belt or the like comprising:

housing means providing an elongated interior cavity having two opposite ends and including an opening which opens between the exterior of the housing means and the interior cavity at one end thereof;

piston means having a head which is positioned within the interior cavity for movement therealong between the opposite ends thereof and for dividing at least a part of the interior cavity into first and second variable-volume chambers for holding hydraulic fluid wherein the first variable-volume chamber is disposed on one side of the piston head opposite said one cavity end and a second variable-volume chamber is disposed on the other side of the head, said piston means including a plunger which is connected to the head for movement with the head along the cavity and having an end portion which extends through the opening in the housing means for interaction of the housing means and plunger between a power transmission belt and a stationary structure adjacent the belt;

a spring interposed between the piston means and the housing means for biasing the piston means toward said one end of the interior cavity from the other end thereof;

bellows means connected between the piston means and the housing means for separating the second variable-volume chamber from the opening in the housing means and for accommodating limited changes in the fluid volume of the variable-volume chambers; and flow control means associated with the first and second variable-volume chambers for permitting a substantially unrestricted flow of hydraulic fluid from the second variable-volume chamber to the first variable-volume chamber as the piston head is moved by the spring toward said one cavity end and for permitting a controlled flow of hydraulic fluid from the first variable-volume chamber to the second variable-volume chamber as the piston head is moved against the force of the spring away from said one cavity end.

2. The tensioner as defined in claim 1 wherein said bellows means is formed so as to encircle at least a part of said piston means and having two opposite ends, one end of the bellows means sealingly joined to the piston means and the other end of the bellows means sealingly joined to the housing means so that the one end of the bellows means moves with the piston head and the other end of the bellows means remains in a stationary relationship with respect to the housing means.

3. The tensioner as defined in claim 2 wherein the bellows means includes at least one annular bellows fold between its ends.

4. The tensioner as defined in claim 2 wherein the bellows means is comprised of a fluid-impermeable material possessing a degree of resiliency.

5. The tensioner as defined in claim 2 wherein the piston head and plunger are joined together in axial alignment and the one end of the bellows means is sandwiched generally between the piston head and the plunger.

6. The tensioner as defined in claim 2 wherein the other end of the bellows means is sealingly joined to the housing means adjacent the opening at one end thereof.

7. The tensioner as defined in claim 1 wherein the flow control means includes a passageway provided within the piston head which communicates between the first and second variable-volume chambers and the flow control means further includes check valve means associated with the piston head passageway for permitting a substantially unrestricted flow of fluid through the passageway in only one direction wherein the one direction corresponds to the direction of fluid flow from the second chamber to the first chamber.

8. The tensioner as defined in claim 7 wherein the passageway includes an entrance opening into the first chamber, and the check valve means includes a ball positioned adjacent the passageway entrance and means for biasing the ball into seating relationship with the passageway entrance.

9. The tensioner as defined in claim 7 wherein the passageway is a first passageway and the flow control means further includes a second passageway within the piston head which communicates between the first and second variable-volume chambers, said second passageway possessing a relatively small cross section for providing an orifice through which fluid is permitted to flow at a controlled rate from the first chamber to the second chamber.

10. The tensioner as defined in claim 7 wherein the piston head passageway and ball cooperate with one another to permit a controlled flow of fluid through the passageway in the direction opposite said one direction to thereby limit the rate at which fluid can flow through the passageway in said opposite direction.

11. The tensioner as defined in claim 7 wherein the piston means further includes a bellows portion connected between the piston head and the housing means for permitting substantially frictionless movement of the piston head along the length of the housing cavity.

12. The tensioner as defined in claim 11 wherein the bellows portion is formed so as to encircle at least part of the piston head and has two opposite ends, one end of the bellows portion being sealingly joined to the piston head and the other end of the bellows portion sealingly joined to the housing means so that as the piston head is moved relative to and along the housing means, the one end of the bellows portion moves with the piston head and the other end of the bellows portion remains in a stationary relationship with respect to the housing means.

13. The tensioner as defined in claim 12 wherein the passageway is a first passageway and the flow control means includes a second passageway provided within one of the piston head and bellows portion which communicates between the first and second variable-volume chambers, said second passageway being relatively small in cross section through which fluid is permitted to flow at a controlled rate from the first chamber to the second chamber.

* * * * *

UNITED STATES PATENT AND TRADEMARK OFFICE
CERTIFICATE OF CORRECTION

PATENT NO. : 5,116,284

DATED : May 26, 1992

INVENTOR(S) : Nakwon Cho

It is certified that error appears in the above-identified patent and that said Letters Patent is hereby corrected as shown below:

<u>Column 5, line 41</u>

Delete "!08", and insert --108-- therefor.

<u>Column 6, line 5</u>

Delete "!14" and insert --114-- therefor.

<u>Column 7, line 55</u>

Delete "10".

<u>Column 8, line 32</u>

Delete "plunge" and insert --plunger-- therefor.

<u>Column 8, line 41</u>

Delete "cag" and insert --cage-- therefor.

<u>Column 8, line 48</u>

Delete "permits" and insert --permit-- therefor.

UNITED STATES PATENT AND TRADEMARK OFFICE
CERTIFICATE OF CORRECTION

PATENT NO.   :   5,116,284
DATED        :   May 26, 1992
INVENTOR(S)  :   Nakwon Cho It is certified that error appears in the above-identified patent and that said Letters Patent is hereby corrected as shown below:

<u>Column 10, line 3</u>

Delete "10".

<u>Column 11, line 11</u>

Delete "10".

Signed and Sealed this

Thirteenth Day of July, 1993

Attest:

MICHAEL K. KIRK

Attesting Officer    Acting Commissioner of Patents and Trademarks